US010393493B2

(12) United States Patent
Shi

(10) Patent No.: US 10,393,493 B2
(45) Date of Patent: Aug. 27, 2019

(54) WATERPROOF LEVER-TYPE INDICATOR

(71) Applicant: Weidong Shi, Wuxi (CN)

(72) Inventor: Weidong Shi, Wuxi (CN)

(\*) Notice: Subject to any disclaimer, the term of this patent is extended or adjusted under 35 U.S.C. 154(b) by 194 days.

(21) Appl. No.: 15/729,557

(22) Filed: Oct. 10, 2017

(65) Prior Publication Data

US 2018/0202791 A1    Jul. 19, 2018

(30) Foreign Application Priority Data

Jan. 18, 2017  (CN) .................... 2017 2 0061408 U

(51) Int. Cl.
*G01B 5/24*    (2006.01)
*G01B 3/22*    (2006.01)

(52) U.S. Cl.
CPC ............ *G01B 5/24* (2013.01); *G01B 3/22* (2013.01)

(58) Field of Classification Search
CPC .................................... G01B 5/24; G01B 3/22
USPC ........................................................... 33/538
See application file for complete search history.

(56) References Cited

U.S. PATENT DOCUMENTS

2009/0301383 A1\* 12/2009 Clarke .................. F16B 31/025
116/212

\* cited by examiner

*Primary Examiner* — Walter L Lindsay, Jr.
*Assistant Examiner* — Philipmarcus T Fadul
(74) *Attorney, Agent, or Firm* — Wayne & Ken, LLC; Tony Hom

(57) ABSTRACT

The present invention discloses a waterproof lever-type indicator, comprising: a housing, a probe, a dial plate and a transmission mechanism. The probe and the dial plate are positioned at both ends of the housing respectively, the transmission mechanism is positioned inside the housing to connect the mounting shaft and the pointer on the dial plate, the end portion of the housing is provided as an enclosed structure, and the probe is in fixed connection with the mounting shaft extending beyond a side wall of the housing. When this indicator is put to practical use, compared with the open design of the end portion, the enclosed structure of the end portion of the housing can reduce possibility that foreign matters enter the indicator, promote the reliability of the indicator and prolong the instrument service life, especially in the workshop environment where foreign matters are more likely to generate.

8 Claims, 6 Drawing Sheets

WATERPROOF LEVER-TYPE INDICATOR

TECHNICAL FIELD

The present invention relates to the technical field of measurement auxiliary tools, and in particular, to a waterproof lever-type indicator.

BACKGROUND ART

A lever-type indicator is a measurement tool that utilizes lever-gear transmission mechanism or lever-spiral transmission mechanism to convert the size change of the probe to the angular displacement change of the pointer, and indicates the correctness of length and size values when applied to measuring geometrical shapes and mutual alignment of pieces.

Currently, a Chinese patent with the publication number CN201622081U discloses a lever indicator transmission apparatus, a probe stick is provided on the indicator body, a probe is provided at the front end of the probe stick, the rear end of the probe stick is hinged to the indicator body via a hinge axis, a front lever is provided on the hinge axis, the front lever is in tight fit with the probe stick, a shift fork is provided at the upper end of the front lever, a pivot is provided on the indicator body, a rear lever is provided on the pivot, reversing pins are provided on rear levers at both sides of the pivot, respectively, the shift fork is engaged with the reversing pin, a nylon shift block is provided at the other end of the rear lever, a rotatable screw is provided on the indicator body, the nylon shift block is engaged with the screw, and a pointer is provided at one end of the screw.

This type of lever indicator does not possess waterproof and dustproof functions, because the probe extends beyond the end portion of the housing and forms a gap at the end portion of the housing. Such a structure may allow foreign matters such as water, dust and oil cutting fluid to enter the interior of the indicator, the interior parts and components within the lever indicator may be polluted, especially in a mechanical workshop environment where cutting fluid is generated, as a result, failure of the lever indicator is more likely to happen and meanwhile the service life of the indicator is reduced.

SUMMARY OF THE INVENTION

One object of the present invention is to provide a waterproof lever-type indicator, which enables the lever indicator to possess waterproof and dustproof functions, so as to ensure that the interior parts and components of the lever indicator are free from pollution, and prolong the service life of the lever indicator.

The aforementioned technical object is achieved through the following technical solutions:

A waterproof lever-type indicator, including a housing, a probe, a dial plate, a mounting shaft, a transmission mechanism, and a pointer. The probe and the dial plate are positioned at both ends of the housing, respectively, and the transmission mechanism are positioned inside the housing to connect the probe and the pointer, the housing is provided as an enclosed structure and the output end of the transmission mechanism is in transmission connection with the pointer on the dial plate, the housing is provided with a through-hole, one end of the mounting shaft extends into the housing via the through-hole and is in transmission connection with the input end of the transmission mechanism, the other end of the mounting shaft extends beyond the housing and is in fixed connection with the probe, the probe drives the pointer to deflect via the mounting shaft and the transmission mechanism, and a first sealing ring for sealing the through-hole is sleeved on the mounting shaft.

By implementing the aforementioned technical solution, when this indicator is put to practical use, compared with the open design of the end portion, the enclosed structure of the end portion of the housing can reduce possibility that foreign matters enter the indicator, promote the reliability of the indicator and prolong the instrument service life, especially in the workshop environment where foreign matters such as water, dust, cooling liquid, cutting fluid and swarf are more likely to generate. In the meantime of rotation, the first sealing ring decreases the possibility that foreign matters enter the interior of the housing.

Further settings: a supporting member is sleeved on the mounting shaft, the supporting member is positioned between the mounting shaft and the through-hole, and the supporting member is mounted on the housing by means of locking or press-fit.

By implementing the aforementioned technical solution, the locking or press-fit means can effectively reduce transmission loss, making the transmission structure more accurate.

Further settings: an end portion of the housing is provided with an opening on a surface away from the through hole, the through-hole and the opening are positioned at the same end portion of the housing, the opening is covered with a cover plate, and the cover plate is in sealed connection with the opening through a sealing gasket.

By implementing the aforementioned technical solution, the space at the opening is used for accommodating the transmission mechanism, the cover plate is used for blocking foreign matters, the sealing gasket has the effect of improving the sealing, and on the basis of the cover plate that blocks the external impact and hard foreign matters, the sealing gasket decreases the possibility that fluid foreign matters enter the housing.

Further settings: the probe includes a bulb, a probe stick and a connection base, the connection base is sleeved on the mounting shaft and is in fixed connection with the mounting shaft, one end of the probe stick is in fixed connection with the connection base, the other end of the probe stick is in fixed connection with the bulb, and the probe stick is perpendicular to the axis of the mounting shaft.

By implementing the aforementioned technical solution, the periphery profiles of the bulb are the same, and the surface condition of the subject to be measured can be measured accurately; the bulb drives the probe stick, the result measured by the bulb is magnified by the probe stick according to the lever principle, the result measured by the bulb is delivered to the connection base, and then the connection base delivers the movement to the transmission mechanism.

Further settings: the dial plate includes a cover, a bezel and a center positioning base, the positioning base is in fixed connection with the housing, the central portion of the center positioning base is provided with a passage allowing the transmission mechanism to pass through, the bezel is sleeved on the center positioning base, and the cover is arranged on the bezel.

By implementing the aforementioned technical solution, the cover is used for protecting parts such as the bezel; the movement condition on the transmission mechanism acts on the dial plate via the passage and enables corresponding changes to occur on the dial plate.

Further settings: a second sealing ring for preventing water and dust from entering the housing is provided between the center positioning base and the housing, and the second sealing ring is sleeved on the center positioning base.

By implementing the aforementioned technical solution, the second sealing ring is used for decreasing the possibility that foreign matters enter the housing from the center positioning base.

Further settings: a third sealing ring for preventing water and dust from entering the center positioning base is sleeved on the center positioning base, and the third sealing ring is arranged between the center positioning base and the bezel.

By implementing the aforementioned technical solution, the possibility that foreign matters enter the bezel and the center positioning base are decreased.

Further settings: a recess portion for accommodating the cover is formed on the top surface of the bezel, the cover is arranged in the recess portion, and a fourth sealing ring for preventing water and dust from entering the bezel is sleeved on the cover, the fourth sealing ring is arranged between the cover and the recess portion.

By implementing the aforementioned technical solution, a gap exists between the cover and the recess portion, the fourth sealing ring decreases the possibility that foreign matters enter the housing through the gap.

In conclusion, the present invention has the following beneficial effects: the possibility that foreign matters enter the housing can be effectively decreased, the measurement accuracy of the instrument can be improved, and meanwhile the service life of the instrument can be prolonged.

Figure 1:
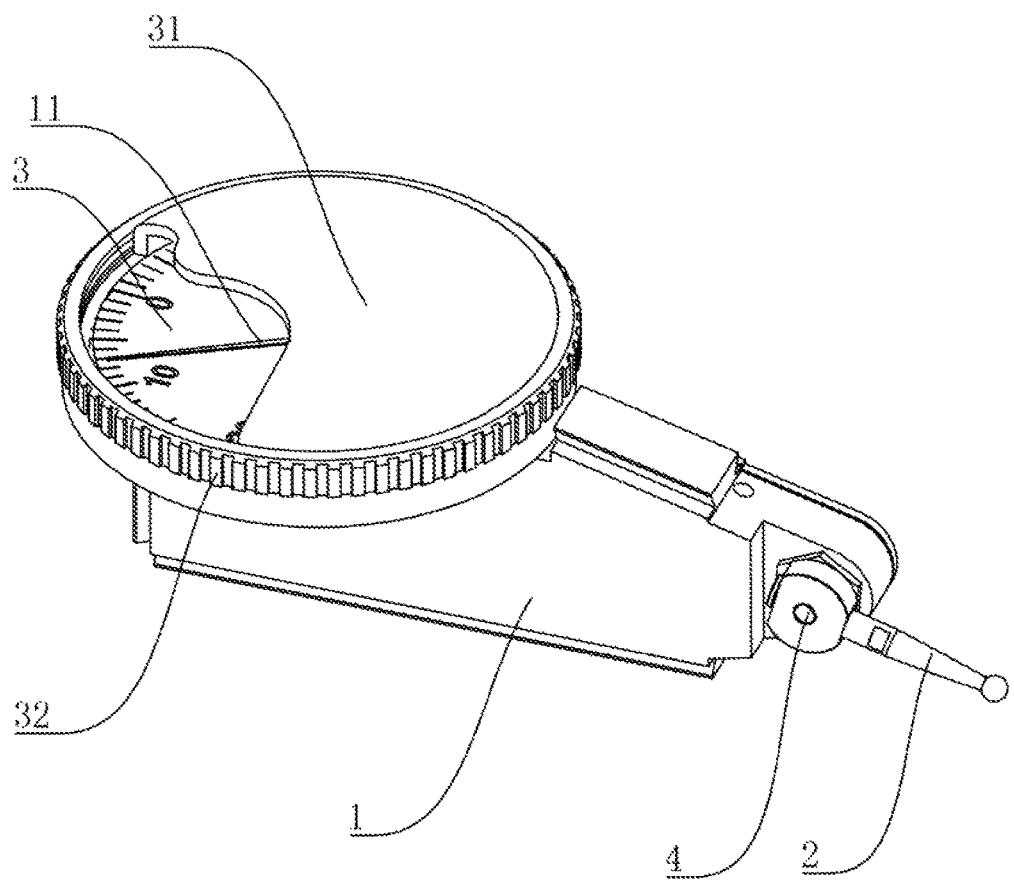
FIG. 1 is a structural schematic diagram in top view for illustrating the overall profile of the indicator.
Figure 2:
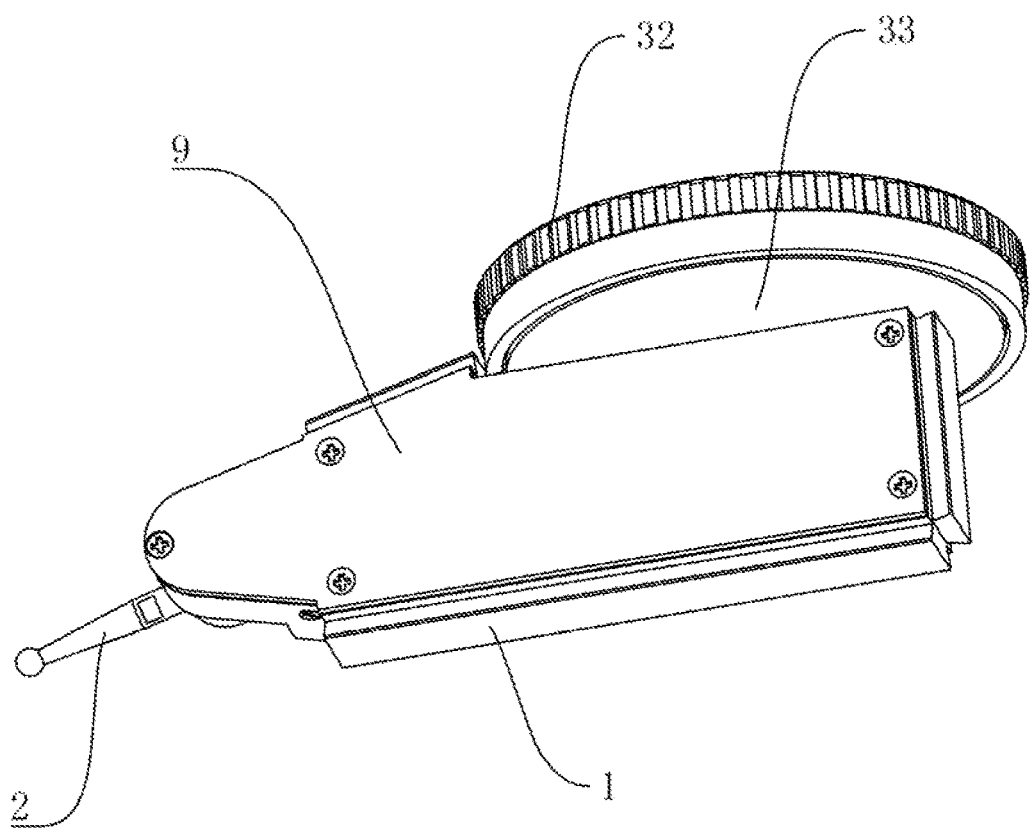
FIG. 2 is a structural schematic diagram in bottom view for illustrating the entirety of the indicator.

In the drawings, 1. Housing; 2. Probe; 21. Connection base; 3. Dial plate; 31. Cover; 32. Bezel; 33. Center positioning base; 34. Second sealing ring; 35. Third sealing ring; 36. Fourth sealing ring; 4. Mounting shaft; 5. Transmission mechanism; 6. First sealing ring; 7. Supporting member; 8. Locking nut; 9. Cover plate; 10. Sealing gasket; 11. Pointer.

DETAILED DESCRIPTION OF THE INVENTION

The present invention is further described in details hereinafter with reference to the drawings.

Like reference numerals denote like parts and components. And it is to be noted that terms used in the following description, such as "front", "rear", "left", "right", "upper" and "lower", refer directions in the drawings, expressions such as "bottom surface", "top surface", "internal" and "external" refer to orientations towards or away the geometric center of certain components, respectively.

Embodiment 1 a waterproof lever-type indicator, including: a housing 1, a probe 2, a dial plate 3, a mounting shaft 4, and a transmission mechanism 5. The dial plate 3 is provided on the housing 1, the transmission mechanism 5 is provided in the housing 1, the output end of the transmission mechanism 5 is in transmission connection with the pointer in the dial plate 3, a through-hole is provided on the housing 1, one end of the mounting shaft 4 extends into the housing 1 via the through-hole and is in transmission connection with the input end of the transmission mechanism 5, the other end of the mounting shaft 4 extends beyond the housing 1 and is in fixed connection with the probe 2, the probe 2 drives the pointer to deflect via the mounting shaft 4 and the transmission mechanism 5, apart from transmission in mechanical manner, transmission in electronic manner can be achieved in that the probe 2 can also measure the displacement by the electronic sensor so as to show the displacement value, a first sealing ring 6 for sealing the through-hole is sleeved on the mounting shaft 4, through the design of the aforementioned structure, the probe 2 is positioned outside the housing 1 by arranging the probe 2 of the lever indicator at one side of the housing 1, and water and dust are prevented from entering the housing 1 by sealing and isolating the housing 1 with the first sealing ring 6, so as to achieve the waterproof and dustproof effects, which ensures that the internal parts and components of the lever indicator are free from pollution during usage and improves the service life of the lever indicator.

In the aforementioned structure, the first sealing ring 6 can be an O-type sealing ring, the transmission mechanism 5 can adopt the lever-gear structure in the prior art, that is, the transmission mechanism includes: a shift stick, a first shift pin, a second shift pin, a sector gear stick, a built-up gear and a center gear, wherein the shift stick, the first shift pin, the second shift pin, the sector gear stick, the built-up gear and the center gear are arranged one by one along the transmission direction, the first shift pin and the second shift pin are both arranged on the sector gear stick, a space is provided between the first shift pin and the second shift pin along the transmission direction, one end of the shift stick is fixed on the mounting shaft 4, rotation of the mounting shaft 4 drives the shift stick to swing, a first recess portion that fits the first shift pin and a second recess portion that fits the second shift pin are provided at the other end of the shift stick, the first and second recess portions are positioned at both sides of the shift stick, the sector gear stick is an one body structure formed with sector teeth and a stick piece combined, wherein the first shift pin and the second shift pin are positioned on the stick piece of the sector gear stick, sector teeth of the sector gear stick are engaged with the built-up gear so as to drive the built-up gear to rotate, the built-up gear includes a first gear and a second gear, the axes of the first and second gears are in a collinear position, the first and second gears are formed integrally, sector teeth of the sector gear stick are engaged with the first gear, the second gear is engaged with the center gear to drive the center gear to rotate, one end of the pointer is in fixed connection with the center of the center gear and rotates as the center gear rotates, and of course, the transmission mechanism 5 also can adopt other structures in the prior art, such as a lever-spiral structure, and the detailed description thereof is omitted here.

Embodiment 2

As an improvement to the Embodiment 1, a supporting member 7 is sleeved on the mounting shaft 4, the supporting member 7 is positioned between the mounting shaft 4 and the through-hole, and the supporting member 7 is mounted on the housing 1 by means of locking or press-fit, in terms of locking means, locking can be achieved by a locking nut 8, in terms of press-fit means, the supporting member 7 can be press-fitted onto the housing 1 directly, the mounting shaft 4 may be well fixed by the supporting member 7, which prevents the mounting shaft 4 from drifting axially and radially.

Embodiment 3

As a specific implementation of Embodiment 1 and Embodiment 2, the through-hole is provided at the end portion of the housing 1. And the through hole is on the surface that is perpendicular to the dial plate 3.

Preferably, an end portion of the housing 1 is provided with an opening on a surface away from the through hole, the through-hole and the opening are positioned at the same end portion of the housing 1, the opening is covered with a cover plate 9, and the cover plate 9 is in sealed connection with the opening through a sealing gasket 10.

Through the design of the aforementioned structure, the cover plate 9 is in sealed connection with the opening on the housing 1 through a sealing gasket 10, which enables water and dust not to enter the housing 1 through the gap between the cover body and the opening of the housing 1 and ensures a pretty good sealing between the cover body and the housing 1.

Embodiment 4

Figure 3:
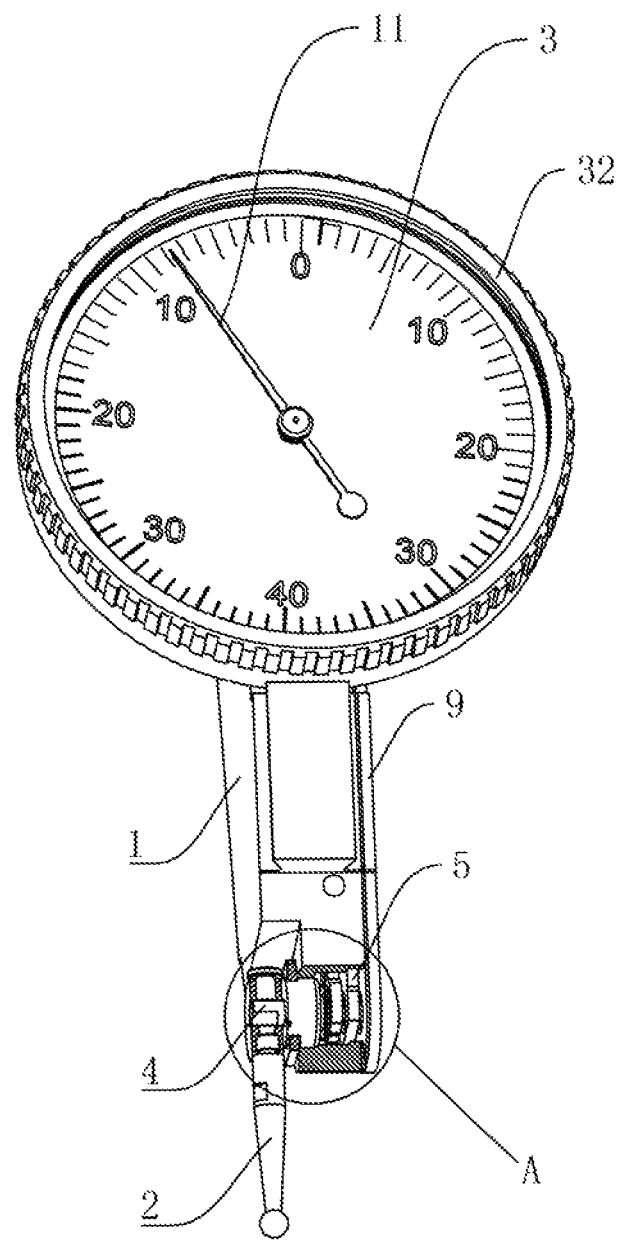
FIG. 3 is a schematic diagram for illustrating the internal structure of the end portion of the housing.
Figure 4:
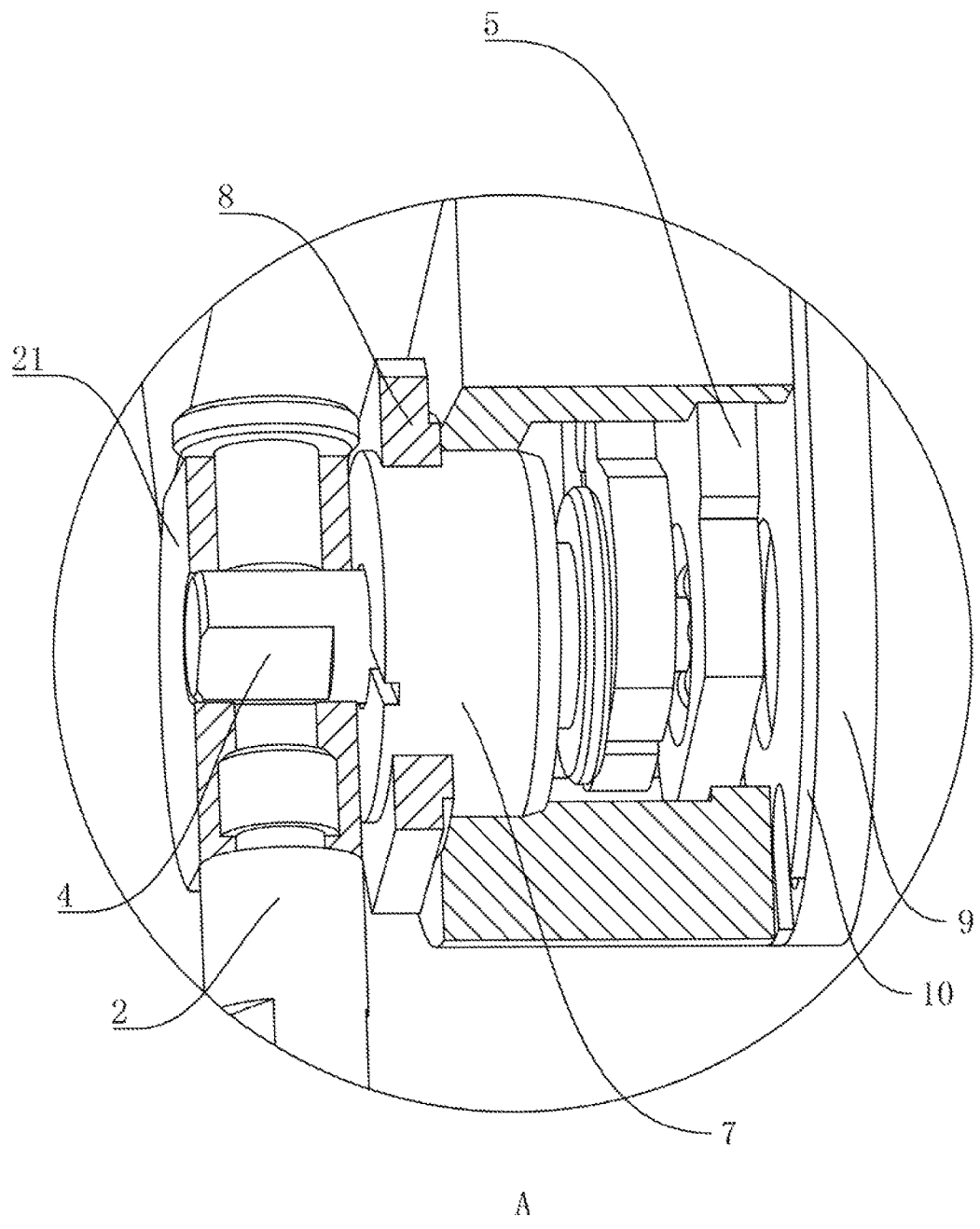
FIG. 4, an enlarged view of part A in FIG. 3, is a schematic diagram for illustrating the structure at the mounting shaft.
Figure 5:
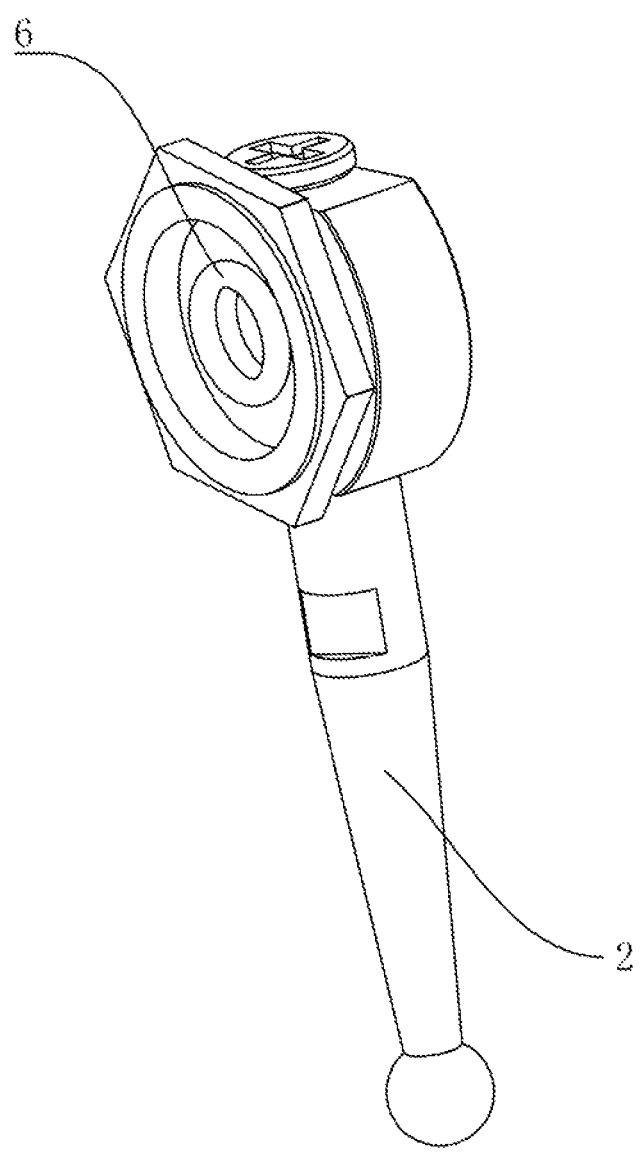
FIG. 5 is a structural schematic diagram for illustrating the probe.
Figure 6:
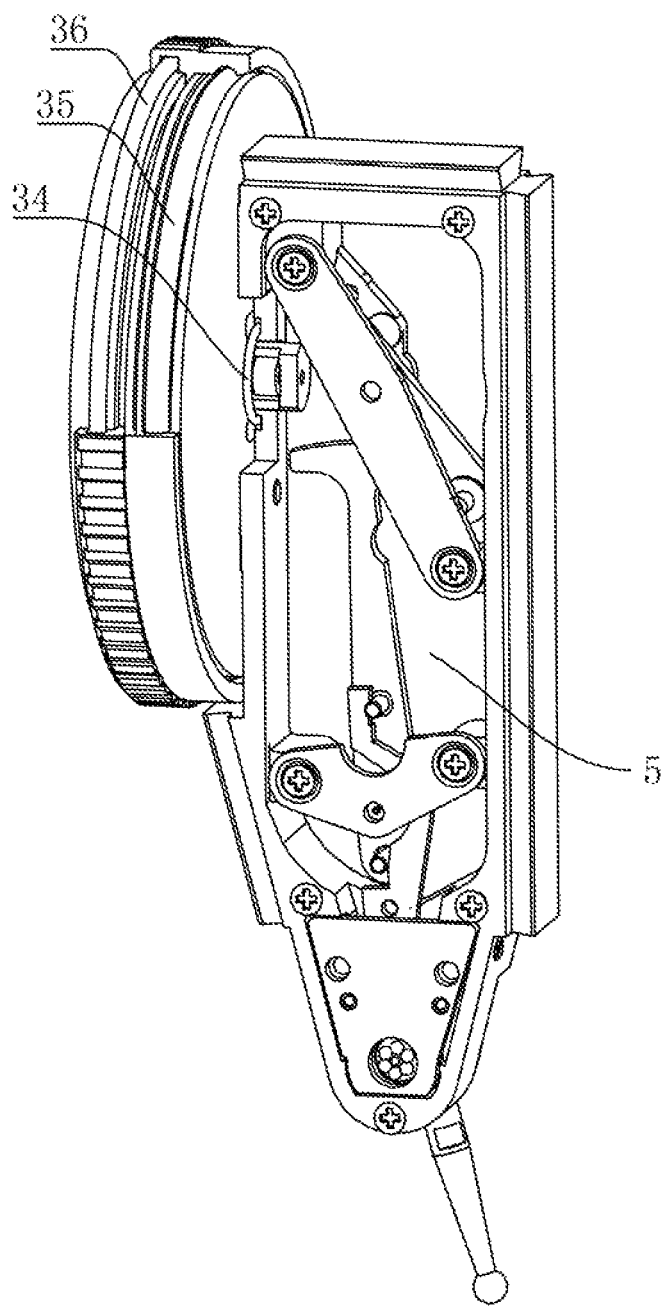
FIG. 6 is a structural schematic diagram for illustrating the transmission mechanism.

As a specific implementation of Embodiment 1, as shown in FIG. 3, the probe 2 includes a bulb, a probe stick and a connection base 21, the connection base 21 is sleeved on the mounting shaft 4 and is in fixed connection with the mounting shaft 4, one end of the probe stick is in fixed connection with the connection base 21, the other end of the probe stick is in fixed connection with the bulb, and the probe stick is perpendicular to the axis of the mounting shaft 4, the probe stick is made to deflect relative to the axis of the mounting shaft 4 through the touch between the bulb and the subject to be measured, the probe stick drives the mounting shaft 4 to rotate via the connection base 21, rotation of the mounting shaft 4 drives the internal parts and components of the transmission mechanism to rotate, and further drives the pointer in the dial plate 3 to deflect.

Embodiment 5

As a specific implementation of Embodiment 1, the dial plate 3 includes a cover 31, a bezel 32 and a center positioning base 33, the positioning base 33 is in fixed connection with the housing 1, the central portion of the center positioning base 33 is provided with a passage allowing the transmission mechanism 5 to pass through, the bezel 32 is sleeved on the center positioning base 33, the cover 31 is arranged on the bezel 32, the dial plate 3 is also provided with a pointer and a dial therein, the output end of the transmission mechanism 5 extends beyond the dial and is in transmission connection with the pointer so as to drive the pointer to rotate, the dial is arranged below the pointer, the dial has scales along the edge thereof, and the pointing end of the pointer orients towards the edge of the dial.

Embodiment 6

As a specific implementation of Embodiment 5, a second sealing ring 34 for preventing water and dust from entering the housing 1 is provided between the center positioning base 33 and the housing 1, the second sealing ring 34 is sleeved on the center positioning base 33, the second sealing ring 34 may be an O-type sealing ring, the sealing effect of the second sealing ring 34 may enable water and dust not to enter the housing 1 through the gap between the center positioning base 33 and the housing 1, so as to achieve the waterproof and dustproof effects.

Embodiment 7

As a specific implementation of Embodiment 5, a third sealing ring 35 for preventing water and dust from entering the center positioning base 33 is sleeved on the center positioning base 33, the third sealing ring is arranged between the center positioning base 33 and the bezel 32, the third sealing ring 35 may be an O-type sealing ring, the sealing effect of the third sealing ring 35 may enable water and dust not to enter the center positioning base 33 through the gap between the center positioning base 33 and the bezel 32, so as to achieve the waterproof and dustproof effects.

Embodiment 8

As a specific implementation of Embodiment 5, a recess portion for accommodating the cover 31 is formed on the top surface of the bezel 32, the cover 31 is arranged in the recess portion, and a fourth sealing ring 36 for preventing water and dust from entering the bezel 32 is sleeved on the cover 31, the fourth sealing ring 36 is arranged between the cover 31 and the recess portion, the fourth sealing ring 36 may be an O-type sealing ring, the sealing effect of the fourth sealing ring 36 may enable water and dust not to enter the bezel 32 through the gap between the recess portion of the bezel 32 and the cover 31, so as to achieve the waterproof and dustproof effects.

Embodiment 9

As a specific implementation of Embodiment 5, the cover 31 is made of transparent materials; the cover 31 should be made of transparent materials because a person needs to see the pointer and the dial inside the dial plate 3 through the cover 31.

Embodiment 10

As an improvement to Embodiment 1, several exposed bolts and pin holes are also provided on the lever indicator, and all these exposed bolts and pin holes should be sealed with sealing glues after being installed, so as to prevent water and dust entering the lever indicator through the gap around the bolts and pin holes and achieve the waterproof and dustproof effects.

The embodiments described above are merely to explain the present invention, not to limit the scope of the present invention. Those skilled in the art may make modifications as required without inventive contributions after reading this description, however, such modifications shall fall within the protection scope of the present invention.

What is claimed is:

1. A waterproof lever-type indicator, comprising: a housing (1), a probe (2), a dial plate (3), a mounting shaft (4), a transmission mechanism (5) and a pointer (11), the probe (2) and the dial plate (3) being positioned at both ends of the housing (1), respectively, and the transmission mechanism (5) being positioned inside the housing (1) to connect the probe (2) and the pointer (11), the pointer (11) being on the dial plate (3), wherein, the end portion of the housing (1) is provided as an enclosed structure, the output end of the transmission mechanism (5) is in transmission connection with the pointer (11) on the dial plate (3), the housing (1) is provided with a through-hole, one end of the mounting shaft (4) extends into the housing (1) via the through-hole and is in transmission connection with the input end of the transmission mechanism (5), the other end of the mounting shaft (4) extends beyond the housing (1) and is in fixed connection with the probe (2), the probe (2) drives the pointer (11) to deflect via the mounting shaft (4) and the transmission mechanism (5), and the mounting shaft (4) is sleeved with a first sealing ring (6) for sealing the through-hole.

2. The waterproof lever-type indicator according to claim 1, wherein, the mounting shaft (4) is sleeved with a supporting member (7), the supporting member (7) is positioned between the mounting shaft (4) and the through-hole, and the supporting member (7) is mounted on the housing (1) by means of locking or press-fit.

3. The waterproof lever-type indicator according to claim 2, wherein, an end portion of the housing (1) is provided with an opening on a surface away from the through hole, the through-hole and the opening are positioned at the same end portion of the housing (1), the opening is covered with a cover plate (9), and the cover plate (9) is in sealed connection with the opening through a sealing gasket (10).

4. The waterproof lever-type indicator according to claim 1, wherein, the probe (2) comprises a bulb, a probe stick and a connection base (21), the connection base (21) is sleeved on the mounting shaft (4) and is in fixed connection with the mounting shaft (4), one end of the probe stick is in fixed connection with the connection base (21), the other end of the probe stick is in fixed connection with the bulb, and the probe stick is perpendicular to the axis of the mounting shaft (4).

5. The waterproof lever-type indicator according to claim 1, wherein, the dial plate (3) comprises a cover (31), a bezel (32) and a center positioning base (33), the positioning base (33) is in fixed connection with the housing (1), the central portion of the center positioning base (33) is provided with a passage allowing the transmission mechanism (5) to pass through, the bezel (32) is sleeved on the center positioning base (33), and the cover (31) is arranged on the bezel (32).

6. The waterproof lever-type indicator according to claim 5, wherein, a second sealing ring (34) for preventing water and dust from entering the housing (1) is provided between the center positioning base (33) and the housing (1), and the second sealing ring (34) is sleeved on the center positioning base (33).

7. The waterproof lever-type indicator according to claim 5, wherein, a third sealing ring (35) for preventing water and dust from entering the center positioning base (33) is sleeved on the center positioning base (33), and the third sealing ring is arranged between the center positioning base (33) and the bezel (32).

8. The waterproof lever-type indicator according to claim 5, wherein, a recess portion for accommodating the cover (31) is formed on a top surface of the bezel (32), the cover (31) is arranged in the recess portion, a fourth sealing ring (36) for preventing water and dust from entering the bezel (32) is sleeved on the cover (31), and the fourth sealing ring (36) is arranged between the cover (31) and the recess portion.

* * * * *